(12) United States Patent
Locker et al.

(10) Patent No.: US 9,134,784 B2
(45) Date of Patent: Sep. 15, 2015

(54) PREDICTIVE POWER STATE TRANSITIONS FOR INFORMATION HANDLING DEVICES

(75) Inventors: Howard Locker, Cary, NC (US);
Akihisa Iwakawa, Kanagawa (JP);
Joshua N. Novak, Wake Forest, NC (US); Nathan J. Peterson, Raleigh, NC (US); Vincent J. DeCaro, Apex, NC (US); Jason P. Parrish, Durham, NC (US); Scott T. Elliott, Rolesville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1142 days.

(21) Appl. No.: 13/149,187

(22) Filed: May 31, 2011

(65) Prior Publication Data

US 2012/0311361 A1 Dec. 6, 2012

(51) Int. Cl.
*G06F 1/32* (2006.01)

(52) U.S. Cl.
CPC ............ *G06F 1/3206* (2013.01); *G06F 1/3234* (2013.01)

(58) Field of Classification Search
CPC ........... G06F 1/32; G06F 1/3203; G06F 1/26; G06F 1/3234; G06F 1/3206; Y02B 60/00; Y02B 60/10; Y02B 60/12
USPC .................. 713/300, 310, 320–324, 330, 340
See application file for complete search history.

(56) References Cited

U.S. PATENT DOCUMENTS

| | | | |
|---|---|---|---|
| 5,954,820 A | 9/1999 | Hetzler | |
| 6,654,895 B1 | 11/2003 | Henkhaus et al. | |
| 6,961,859 B2 * | 11/2005 | Derocher et al. | 713/320 |
| 7,689,850 B2 * | 3/2010 | Cantwell et al. | 713/323 |
| 8,200,371 B2 * | 6/2012 | Weyland | 700/291 |
| 8,281,166 B2 * | 10/2012 | Carroll | 713/310 |
| 8,468,377 B2 * | 6/2013 | Scott et al. | 713/323 |
| 2010/0115309 A1 * | 5/2010 | Carvalho et al. | 713/320 |

* cited by examiner

*Primary Examiner* — Fahmida Rahman
(74) *Attorney, Agent, or Firm* — Ference & Associates LLC

(57) ABSTRACT

Systems, methods and products are described that provide predictive power state transitions for information handling devices. One aspect includes ascertaining a power state transitioning pattern of an information handling device; responsive to a power state transition to a first lower power state at the information handling device, performing an additional power state transition to automatically transition the information handling device to a second lower power state, the second lower power state being a lower power state relative to the first lower power state; and proactively resuming the information handling device to the first lower power state responsive to a timing threshold being met; wherein the timing threshold is determined based on the power state transitioning pattern ascertained. Other embodiments are described.

21 Claims, 2 Drawing Sheets

PREDICTIVE POWER STATE TRANSITIONS FOR INFORMATION HANDLING DEVICES

BACKGROUND

Information handling devices, such as laptop computers, tablet computers, smart phones and the like, typically have power states that attempt to manage a device's power consumption. A device conventionally provides one or more lower powered states that the user may transition to in order to save power.

The Advanced Configuration and Power Interface (ACPI) specification provides an example of a standard for device configuration and power management. The ACPI specification includes the following states. The S0 (or G0) state for when the device is up and running (full power). The G1 or "sleeping state" includes four sub-states S1-S4, as follows. The S1 state is a state in which the CPU stops executing instructions; however, the power supply to the CPU and RAM is maintained, while any devices that are not set to always on are powered down. The S2 state is similar to S1 state; however, the power to the CPU is off. The S3 state, sometimes termed "sleep", "standby", or "suspend to RAM", is a state in which RAM remains powered, but some additional components may be powered down as compared to S2. The S4 state, sometimes referred to as "hibernation" or "suspend to Disk", is a state in which content of memory is saved to non-volatile memory (normally to a hard drive or Flash), and the memory is powered down. S5 (G2) is a "soft off" state in which the device is completely powered down save a few select components that remain powered so the computer can "wake". The G3 or "mechanical off" is a state in which the device is consuming almost no power (conventionally a clock remains powered using a separate power source).

BRIEF SUMMARY

In summary, one aspect provides a method comprising: ascertaining a power state transitioning pattern of an information handling device; responsive to a power state transition to a first lower power state at said information handling device, performing an additional power state transition to automatically transition the information handling device to a second lower power state, said second lower power state being a lower power state relative to said first lower power state; and proactively resuming the information handling device to the first lower power state responsive to a timing threshold being met; wherein the timing threshold is determined based on the power state transitioning pattern ascertained.

Another aspect provides a computer program product comprising: a computer readable storage medium having computer readable program code embodied therewith, the computer readable program code comprising: computer readable program code configured to ascertain a power state transitioning pattern of an information handling device; computer readable program code configured to, responsive to a power state transition to a first lower power state at said information handling device, perform an additional power state transition to automatically transition the information handling device to a second lower power state, said second lower power state being a lower power state relative to said first lower power state; and computer readable program code configured to proactively resume the information handling device to the first lower power state responsive to a timing threshold being met; wherein the timing threshold is determined based on the power state transitioning pattern ascertained.

A further aspect provides an information handling device comprising: one or more processors; and a display device; wherein, responsive to execution of computer program instructions accessible to the one or more processors, the one or more processors are configured to: ascertain a power state transitioning pattern of the information handling device; responsive to a power state transition to a first lower power state at said information handling device, perform an additional power state transition to automatically transition the information handling device to a second lower power state, said second lower power state being a lower power state relative to said first lower power state; and proactively resume the information handling device to the first lower power state responsive to a timing threshold being met; wherein the timing threshold is determined based on the power state transitioning pattern ascertained.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
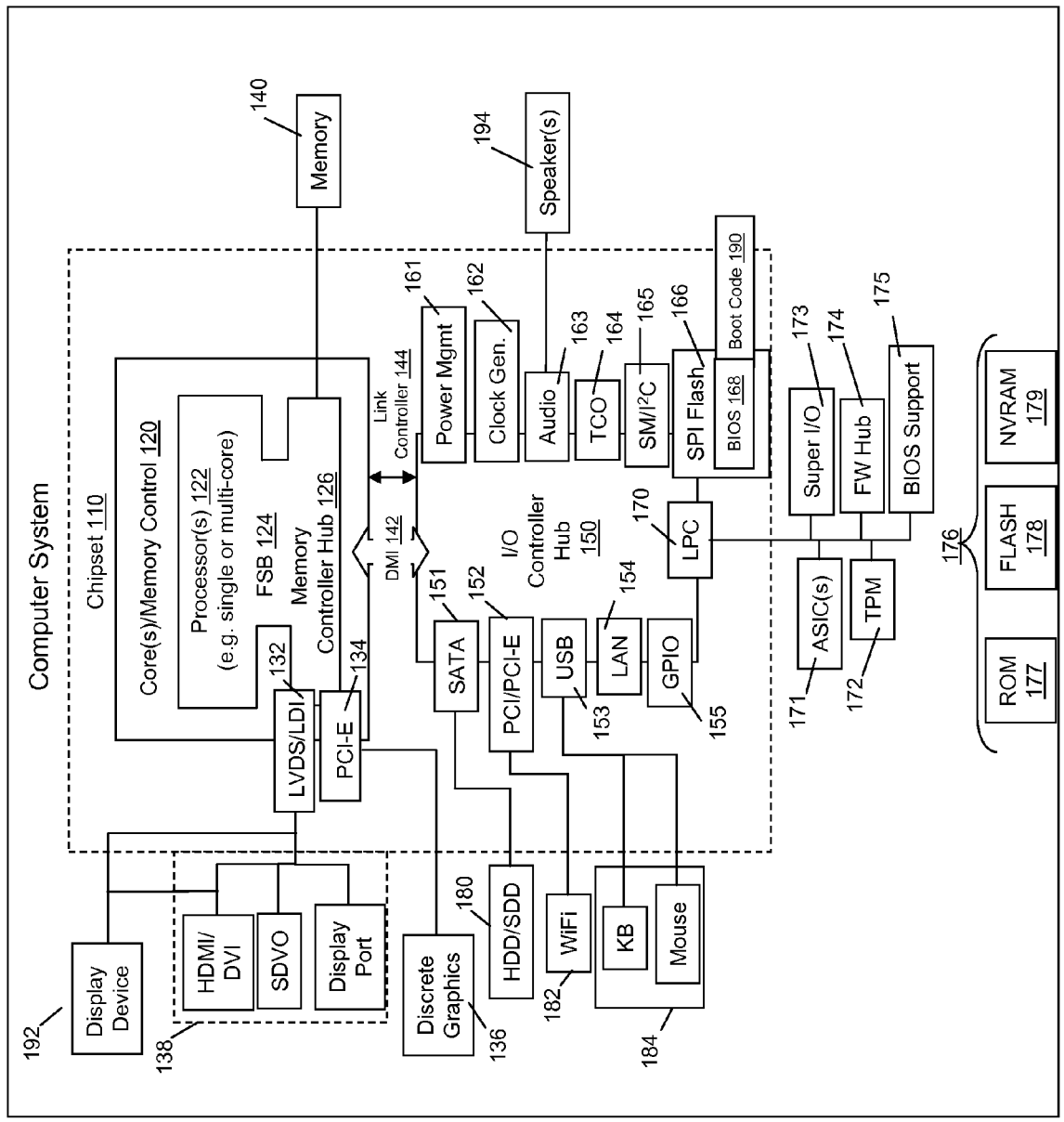
FIG. 1 illustrates an example circuitry of a computer system.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

As information handling devices become a greater part of users' lives, the drive to extend battery life is increasing. Advances in batteries have been made; however, a complimentary approach is conserving power when possible. Power states are conventionally used by a user to manually transition devices to lower powered states in order to conserve power. A common example is a lid-closing event for a laptop computer. Responsive to the lid-closing event, conventionally a laptop transitions from the S0 (full power) state to S3 state, in which power to RAM memory is maintained. This allows the user to quickly resume the system without a lengthy delay (on the order of seconds).

Another common example is a user hibernating a laptop, in which the laptop enters the S4 state, the contents of memory are saved to disk, and the memory is powered down. This permits significant power savings as compared to S3 state, and the user typically chooses hibernation when a longer non-use interval is anticipated. For example, a user leaving work for the day or stopping the device to go to sleep may choose to hibernate the device. However, users may not prefer hibernation as compared to S3, as resuming the device from S4 (hibernation) is lengthier (on the order of minutes) compared to the seconds of resuming from S3. Nonetheless, if the device is left in S3, the device, for example to maintain power to memory, consumes a significant amount of power (for example about 0.5 W/hour).

An embodiment provides predictive power state transitioning for information handling devices. An embodiment is able to learn a user's device usage patterns to proactively transition a device into a lower power state proactively. An embodiment additionally may learn from the user's device usage patterns to re-transition to the power state the user has chosen prior to the anticipated next usage of the device. Thus, an embodiment provides transparent power savings, extending the usable life of a charged battery of the device without materially interfering with the user's expectations.

An embodiment may achieve predictive power state transitioning by proactively shifting a device between power states using learned usage patterns. An embodiment transitions a device to a lower power state than that selected by a user for a period of time anticipated not to interfere with the user's expectations, such that the device may be automatically transitioned back to the higher power state (selected by the user) prior to the user next using the device. For example, an embodiment records S0 state to S3 state transitions, and S3 state to S0 state transitions. This may be accomplished in a variety of ways, for example by recording lid open and lid close events in the case of a laptop computing device. It will be readily understood, however, that each device may have its own means to initiate power state transitions.

An embodiment learns usage patterns in order to permit proactive transitioning from a higher power state chosen by the user (for example, S3 state) to a lower power state (for example, S4 state), in order to facilitate energy (battery charge) conservation while the device is not being used. An embodiment may learn these usage patterns by recording power transition events, as above, and clustering these to determine patterns in power transition behavior. For example, each cluster may include a set of data points that show predictability in power transition behavior. Each cluster may have an average lid open time associated therewith, representative of how long the user keeps the device in S3 state, responsive to a lid close event (transitioning the device into S3 state, that is, lid close times may also be recorded). Each cluster may also have a standard deviation (SD) associated therewith. An embodiment may take into account local time, such that each data point of a cluster is from the same local time, or a suitable adjustment thereto.

For example, a cluster may include the following data points representative of lid-opening times: 7:00 a.m.; 7:30 a.m.; 7:15 a.m.; and 7:45 a.m. Thus, the average lid-opening time is 7:23 a.m. for this cluster, with a SD of 19.4 minutes. The lid close time for this cluster (the day before each lid-opening time) may be for example: 5:00 p.m.; 6:00 p.m.; 6:30 p.m.; and 5:30 p.m. A minimum threshold may be established for recordation of lid close to lid open times, for example in excess of two hours. Thus, an embodiment may record the lid close time, the lid open time, and the time zone (if practicable).

New cluster input is placed in the correct cluster. For example, for a new input (lid open time), an embodiment may compare the time of the lid open, date, and time zone against the available (existing) clusters' average lid open time and SD. The new input may thus be matched and added to the appropriate cluster. The precision of adding the new input may be modified. For example, if a small number of data points exist (for example, under 20), the new input is added to the appropriate cluster if within one hour of the cluster's average lid open time. If there are a large number of data points for the cluster (for example, in excess of 20), then the new input may be matched and input to a cluster if within 2 SD of the cluster. If there is no match for the new input, a new cluster may be started to contain it. Once an input is added to a cluster, the cluster statistics may be updated.

Regarding managing the clusters, the clusters may be cleaned up as follows. If a cluster is disabled (for example, due to inactivity), an embodiment may determine if it should be re-enabled. For any cluster having a certain number of data points (for example, in excess of five), an embodiment may determine that the cluster should be split into one or more other clusters. For example, for a cluster that has data points that seem to differ based on the day of the week (for example, Monday-Friday data points differing significantly from Saturday-Sunday data points), an embodiment may establish two clusters from the one, that is, one for Monday-Friday and another for Saturday-Sunday. For a cluster having a certain number of data points, for example more than twenty, an embodiment may delete outlying data points, for example those more than two SD away from the average.

Once an embodiment has established a usage pattern for power state transitioning to a predetermined confidence, such as via clustering techniques, predictive transitioning may be implemented. The predictive power state transitioning permits the device to automatically save battery charge for the user, without interfering with the device's operational characteristics, particularly with regard to resume times.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of computing system circuits, circuitry or components. The example depicted in FIG. 1 may correspond to computing systems such as the THINKPAD series of personal computers sold by Lenovo (US) Inc. of Morrisville, N.C., or other devices such as smart phones, tablet devices, and the like, as noted below. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for input devices 184 such as a digitizer, keyboard, mice, cameras, phones, storage, other connected devices, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

For example, with regard to smart phone and/or tablet circuitry, an example includes an ARM based system (system on a chip) design. Internal busses and the like depend on different vendors, but essentially all the peripheral devices may attach to a single chip. In contrast to the circuitry illustrated in FIG. 1, the tablet circuitry combines the processor, memory control, and I/O controller hub all into a single chip. Also, ARM based systems do not typically use SATA or PCI or LPC. Common interfaces for example include SDIO and I2C. There are power management chips, and in the at least one design, a single chip is used to supply BIOS like functionality and DRAM memory.

Figure 2:
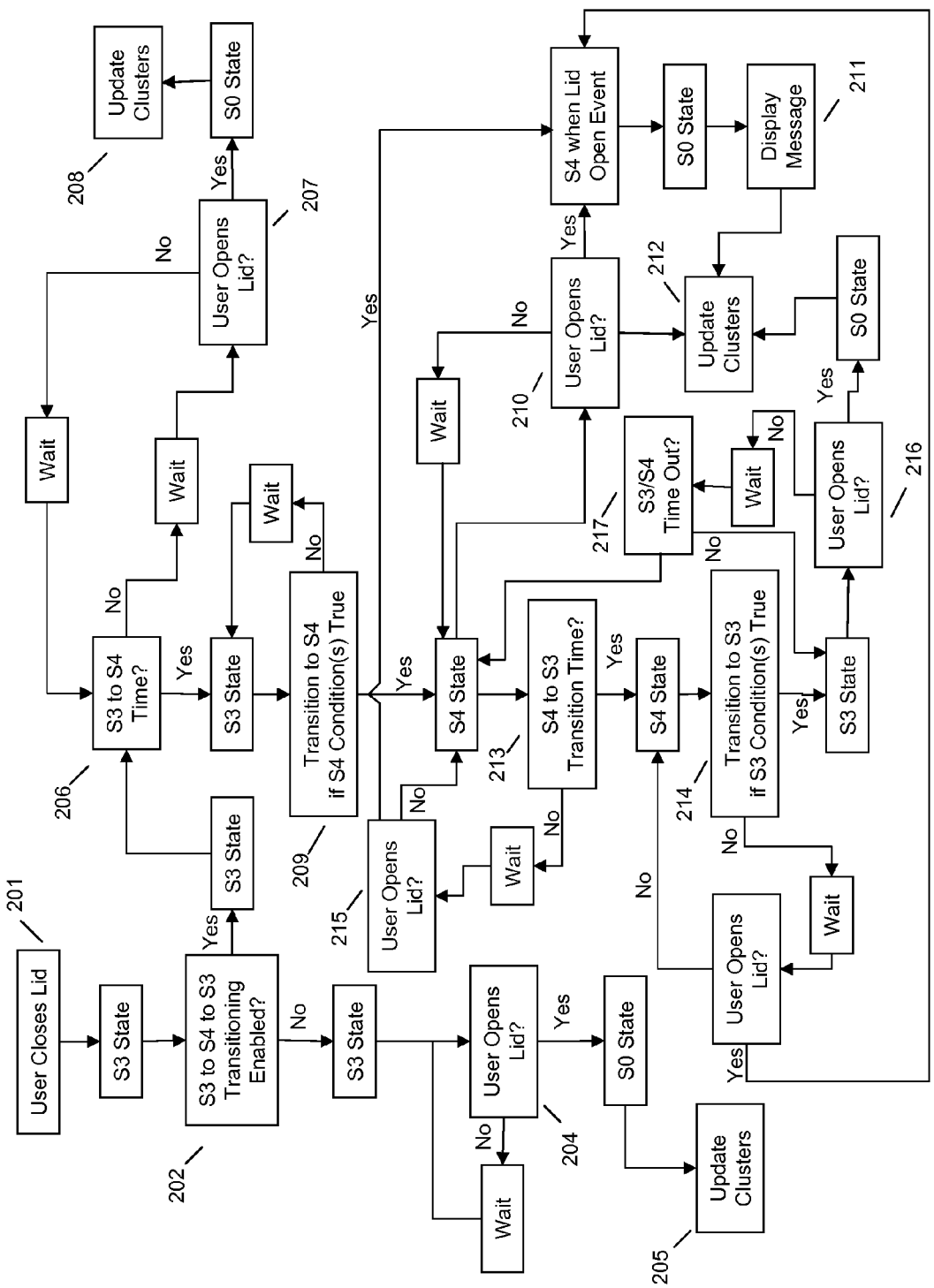
FIG. 2 illustrates an example method for predictive power state transitioning.

FIG. 2 illustrates an example process for predictive power state transitioning. The example illustrated in FIG. 2 assumes certain device and operating characteristics based on an example implementation for a laptop computing device (for example, "lid-opening" as a power state transitioning event); however, these device and operational characteristics are non-essential and may be easily modified to account for other devices having other characteristics. For example, a "lid-opening" may not occur on a device not having a lid, in which case a suitable alternative power transitioning event may be substituted, or a device may have different power states to which it may transition, and the like.

If a user is operating a device, the device will be in S0 state, that is, full power. Responsive to a lid closing event 201, the device will enter the S3 state in order to conserve some power, yet be open to quick resuming by the user. At 202 it is determined if S3 to S4 to S3 transitioning ("transitioning feature") is enabled on the device, as this feature may optionally be disabled, for example via a user selection. If this transitioning feature is not enabled, the device remains in S3 state and awaits a lid-opening 204 (or other resume event, as the case may be), in response to which the device will resume to the full power S0 state, and optionally the clusters may be updated at 205 to facilitate learning usage patterns (even, for example, if the transitioning feature is disabled).

If the transitioning feature is enabled, an embodiment determines if transitioning time from S3 state to S4 state has been reached at 206. If not, an embodiment may await either a lid-opening event at 207, in which case the device will resume to state S0 and clusters may be updated at 208, or await the S3 to S4 transition time to be reached. The S3 to S4 transition time is configurable, as further described herein.

Responsive to the S3 to S4 transition time being reached, an embodiment transitions the device to S4, optionally only responsive to certain S4 condition(s) being true at 209. S4 state conditions attempt to predict that it will be worth while, from a power saving perspective, to transition the device into S4 state from S3 state, without burdening the user. For example, it may not be appropriate to transition the device from S3 state to S4 state if the user is charging an external device (for example, a mobile phone) with the device (for example, a laptop) while in S3 state. Similarly, it may not be appropriate to transition the device to an S4 state from the S3 state if the proactive S4 to S3 transition point cannot be determined (that is, it is not clear when the user is likely to resume use of the device). Moreover, it may not be appropriate to transition the device from S3 state to S4 if the user is anticipated to use the device shortly (for example, within 20 minutes), as an embodiment would transition from the S4 state back to the S3 state in a short amount of time, limiting the power savings.

Example S4 condition(s) may include but are not necessarily limited to an always on USB is disabled in S4 state/S5 state, the next predictive S4 state to S3 state transition point is determinable (it will not be if the user has not been predictably state transitioning the device), the device is being used in the same time zone as the next S4 state to S3 state transition point, and the next S4 state to S3 transition point is greater than a predetermined amount of time away (for example, two hours). Any, none, or all of these conditions may be required prior to transitioning the device to S4 state, or a suitable combination of the foregoing.

While in the S4 state, it is possible that a user may provide a lid-opening event while in S4 210. If the device battery is critically low, the lid open event may be ignored or an appropriate action may be performed (for example, issuing an alarm that the battery is critically low). If the lid open event occurs outside of a predefined threshold of the anticipated average lid-opening time, for example 2 SD, an embodiment may record the lid-opening event to update clustering information 212. If the lid-opening event is far outside of the predicted lid-opening, for example outside 4 SD, the cluster used for the prediction may be disabled and new cluster started for the new lid-opening event. If the mis-predicted lid-opening event (that is, lid-opening while in S4 state) is a one time event, then the disabled cluster may be re-enabled later; otherwise a new cluster may be created and used.

If the user opens the lid while in S4 state 210, an embodiment may transition the device to the S0 state (for example, there is sufficient battery charge to power up the device), and optionally a popup message may displayed 211 explaining why the device was in S4 state, as the device will likely not resume as quickly as if the device had been left in S3 state. Cluster(s) may be updated in any event 212.

Absent a lid open event in S4 state, once in the S4 state (S4 to S3 condition(s) met at 209), an embodiment attempts to proactively transition the device back to the S3 state prior to the user wanting to resume it, such that the power savings from the S4 state transition are transparent to the user. Thus, an embodiment will maintain the S4 state until it is determined that S4 to S3 transition time has been reached 213. This time may be determined via using learning techniques such as clustering described herein.

An embodiment may periodically wake to check the time that has elapsed (for example, time elapsed in the S4 state). For example, an embodiment may implement an additional, stand alone circuit that is dedicated to such a function that uses only a negligible amount of power. Alternatively, an embodiment may integrate a timing circuit into existing circuitry. In one embodiment, the real time clock, included in conventional systems chip sets, is not used because this uses too much power to offer power savings as described herein (that is, too much power is required to operate such a circuit).

For example, an embodiment determines the next likely lid-opening event. As an example, the earliest lid open time within the next cluster in time may be selected, and the S4 to S3 transition time may be set as this time, minus two SD or thirty minutes. The choice of whether to use the SD or a predetermined time (30 minutes or the like) may depend on the confidence of the prediction, or another factor such as the actual amount of time desired. For example, an embodiment may use the SD approach if the SD yields a subtraction time greater than thirty minutes, whereas if the SD is less than 15 minutes, the subtraction from earliest lid-opening time may be set to a predetermined time (for example, 30 minutes). Using the example lid closing and opening times described herein, an embodiment may perform an S4 state to S3 state transition at 6:20 a.m. Additional intelligent techniques may also be implemented, such as allowing a cluster (for the predicted transition time) having a matching day to override a cluster from data points from other day(s), such as a Monday-Friday cluster or a Saturday-Sunday cluster. For example, if it is Thursday, and an embodiment identifies a Thursday cluster having an S4 to S3 transition point, it may be used instead of another cluster (for example, a Monday-Friday cluster).

Thus, an embodiment may transition from the S4 state to the S3 state if the S4 to S3 transition time has been reached at 213, optionally subject to S3 conditions being met 214. The S3 conditions attempt to establish when, if ever, it is not advisable to transition back to S3 state from S4 state. For example, it may not be appropriate to transition to S3 state if the battery is critically low, or if the user has overridden the transitioning feature, for example to indicate that the user wishes the device to transition to S4 state after one hour in S3 state. Thus, example S3 conditions may include a battery critically low condition, a user override condition, et cetera. Any, all, none or some suitable combination of these S3 conditions may be utilized.

Responsive to determining that the S3 conditions are true at 214, an embodiment transitions the device to S3 state. If the S3 conditions are not true, an embodiment may wait in S4 state. As before, if the device is waiting in S4 and the user opens the lid 215, the device is resumed to S0 (or an appropriate action is taken, as described herein) and an embodiment may provide a pop up message 211 explaining why the device was in S4 (as described herein), and also may update clustering information 212 for disabling/starting a new cluster, as appropriate.

While in the S3 state (proactively predicting that the user will wish to resume the device in the near future), an embodiment may determine that an S3/S4 timeout has been reached at 217. For example, if an embodiment transitions the device to the S3 state in anticipation of a lid-opening event, and the lid-opening event does not occur (for example, within a predetermined time), an embodiment may time out the S3 state and transition the device back to the S4 state. This would correspond to the case where a user has closed the lid at the end of work, the user does not work the next day, even though it is typically a work day (for example, the user has taken the day off), and an embodiment mistakenly predicts that the device will be resumed at 7:30 a.m. the next morning, as if the user would be at work. If the user does not work on the next day, the lid-opening event may not take place, and an embodiment may transition the device back to S4 to preserve the battery after the time out.

Otherwise, if the user does open the lid in the S3 state 216, an embodiment transitions the device back to the S0 state, and battery savings have been achieved transparently by shifting the device to the S4 state while the user was not using the device. Clusters may again be updated responsive to the lid-opening event 212.

Embodiments may be implemented in one or more computing devices configured appropriately to execute program instructions consistent with the functionality of the embodiments as described herein. In this regard, FIG. 1 describes a non-limiting example of such a computing device. While mobile computing systems such as laptop computers have been specifically mentioned as examples herein, embodiments may be implemented using other computing systems, such as desktops, workstations, servers, or other information handling devices generally, such as smart phones and the like.

As will be appreciated by one skilled in the art, various aspects may be embodied as a system, method or computer program product. Accordingly, aspects may take the form of an entirely hardware embodiment or an embodiment including software that may all generally be referred to herein as a "circuit," "module" or "system." Furthermore, aspects may take the form of a computer program product embodied in one or more computer readable medium(s) having computer readable program code embodied thereon.

Any combination of one or more non-signal computer readable medium(s) may be utilized. The non-signal computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples of a computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, apparatuses and computer program products according to various example embodiments. It will be understood that the actions and functionality illustrated may be implemented at least in part by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified.

The computer program instructions may also be stored in a computer readable medium that can direct a computer, other programmable data processing apparatus, or other device(s) to function in a particular manner, such that the instructions stored in the computer readable medium produce an article of manufacture including instructions which implement the function/act specified.

The computer program instructions may also be loaded onto a computer, other programmable data processing apparatus, or other device(s) to cause a series of operational steps to be performed on the computer, other programmable apparatus or other device(s) to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
   ascertaining a power state transitioning pattern of an information handling device;
   responsive to a power state transition to a first lower power state at said information handling device, determining whether transitioning to a second lower power state is enabled on the information handling device;
   determining, based on whether said transitioning to the second lower power state is enabled, a proactive resume point for resuming the information handling device to the first lower power state;
   conditioned on the proactive resume point being determined, thereafter proactively performing an additional power state transition to automatically transition the information handling device to the second lower power state, said second lower power state being a lower power state relative to said first lower power state; and
   proactively resuming the information handling device to the first lower power state responsive to a timing threshold being met with respect to the proactive resume point;
   wherein the timing threshold is determined based on the power state transitioning pattern ascertained.

2. The method according to claim 1, wherein the first lower power state is S3 state.

3. The method according to claim 1, wherein the second lower power state is S4.

4. The method according to claim 1, wherein the ascertaining a power state transitioning pattern of an information handling device further comprises recording power state transitions of said information handling device and creating one or more clusters.

5. The method according to claim 4, wherein the one or more clusters are populated with lid-opening and lid-closing times.

6. The method according to claim 4, wherein the one or more clusters are used to determine the timing threshold.

7. The method according to claim 6, wherein the timing threshold marks a predicted time associated with the proactive resume point at which a user will resume using the information handling device.

8. The method according to claim 7, wherein the timing threshold is not less than a predetermined time prior to the proactive resume point.

9. The method of claim 1, wherein the additional power state transition is automatically performed response to detecting one or more conditions.

10. The method of claim 9, wherein the one or more conditions are selected from the group consisting of an always on component disabled condition, a time zone condition, determinability of the proactive resume point, and a minimum threshold non-use time.

11. A computer program product comprising:
    a non-signal computer readable storage device having computer readable program code embodied therewith, the computer readable program code being executable by a processor and comprising:
    computer readable program code that ascertains a power state transitioning pattern of an information handling device;
    computer readable program code that, responsive to a power state transition to a first lower power state at said information handling device, determines whether transitioning to a second lower power state is enabled on the information handling device:
    computer readable program code that determines, based on whether said transitioning to the second lower power state is enabled, a proactive resume point for resuming the information handling device to the first lower power state;
    computer readable program code that, conditioned on the proactive resume point being determined, proactively performs an additional power state transition to automatically transition the information handling device to the second lower power state, said second lower power state being a lower power state relative to said first lower power state; and
    computer readable program code that proactively resumes the information handling device to the first lower power state responsive to a timing threshold being met with respect to the proactive resume point;
wherein the timing threshold is determined based on the power state transitioning pattern ascertained.

12. The computer program product according to claim 11, wherein the first lower power state is S3 state.

13. The computer program product according to claim 11, wherein the second lower power state is S4.

14. The computer program product according to claim 11, wherein to ascertain a power state transitioning pattern of an information handling device further comprises recording power state transitions of said information handling device and creating one or more clusters.

15. The computer program product according to claim 14, wherein the one or more clusters are populated with lid-opening and lid-closing times.

16. The computer program product according to claim 14, wherein the one or more clusters are used to determine the timing threshold.

17. The computer program product according to claim 16, wherein the timing threshold marks a predicted time associated with the proactive resume point at which a user will resume using the information handling device.

18. The computer program product according to claim 17, wherein the timing threshold is not less than 30 minutes prior to the proactive resume point.

19. The computer program product according to claim 17, wherein the timing threshold is not less than two standard deviations earlier than a cluster used for predicting the proactive resume point.

20. An information handling device comprising:
one or more processors; and
a display device;
wherein, responsive to execution of computer program instructions accessible to the one or more processors, the one or more processors:
ascertain a power state transitioning pattern of the information handling device;
responsive to a power state transition to a first lower power state at said information handling device, determine whether transitioning to a second lower power state is enabled on the information handling device;
determine, based on whether said transitioning to the second lower power state is enabled, a proactive resume point for resuming the information handling device to the first lower power state;
conditioned on the proactive resume point being determined, thereafter proactively perform an additional power state transition to automatically transition the information handling device to the second lower power state, said second lower power state being a lower power state relative to said first lower power state; and
proactively resume the information handling device to the first lower power state responsive to a timing threshold being met with respect to the proactive resume point;
wherein the timing threshold is determined based on the power state transitioning pattern ascertained.

21. The information handling device of claim 20, wherein the information handling device is selected from the group consisting of: a laptop computing device, a tablet computing device, and a smart phone.

* * * * *